United States Patent [19]

Desrosiers et al.

[11] 4,328,658
[45] May 11, 1982

[54] WEED HARVESTER

[76] Inventors: J. Armand Desrosiers, 8744-89 Ave., Edmonton, Alberta, Canada, T6C 1N7; Ralph B. Arner, R.R. 2 Sherwood Park, Alberta, Canada, T8A 3K2

[21] Appl. No.: 189,584

[22] Filed: Sep. 23, 1980

[30] Foreign Application Priority Data

Apr. 15, 1980 [CA] Canada ................................. 349883

[51] Int. Cl.³ ........................................... A01D 44/00
[52] U.S. Cl. ........................................ 56/8; 37/2 R; 172/612
[58] Field of Search ...................... 56/8, 9; 172/612; 37/2 R

[56] References Cited

U.S. PATENT DOCUMENTS

| | | | |
|---|---|---|---|
| 1,897,820 | 2/1933 | Pitchford | 37/2 R |
| 2,603,051 | 7/1952 | Williams | 56/8 |
| 2,825,983 | 3/1958 | Finn | 172/612 |
| 3,133,395 | 5/1964 | Farmer | 56/8 |
| 3,546,857 | 12/1970 | Henning | 56/8 |

FOREIGN PATENT DOCUMENTS 622623 10/1926 France ................................. 56/8

OTHER PUBLICATIONS

Spring Cleaning in Bushlands, The Washington Post and Times Herald, May 1959.

*Primary Examiner*—Paul J. Hirsch
*Attorney, Agent, or Firm*—George H. Dunsmuir; William R. Hinds

[57] ABSTRACT

Aquatic weeds are harvested by dragging a cable through such weeds in a direction substantially perpendicular to the longitudinal axis of the cable while rotating the cable around its longitudinal axis, whereby the weeds are wound around the cable and thus pulled from the bottom of the waterway. The cable passes around a drum on a frame, the frame and cable being rotated together on a platform. The platform is mounted on a land or water based vehicle. The cable can be winched into the frame between blades which cut the weeds from the cable.

11 Claims, 8 Drawing Figures

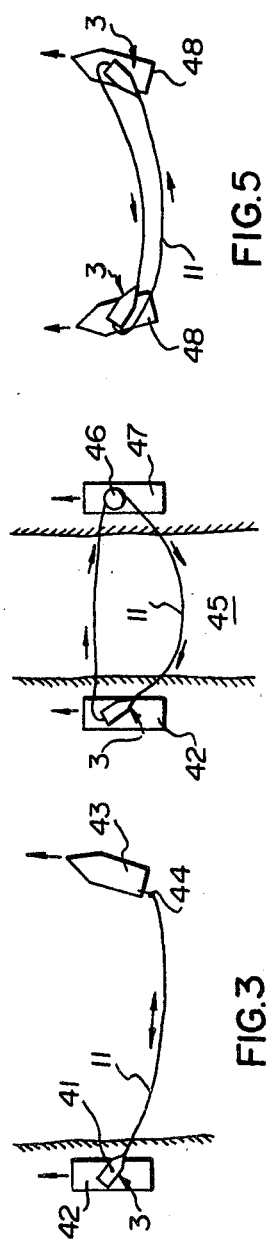

WEED HARVESTER

BACKGROUND OF THE INVENTION

This invention relates to a plant harvester and to a method of harvesting plants.

Land and aquatic weeds are harvested using a variety of devices. Examples of such weed harvesters are found in U.S. Pat. Nos: 2,603,051 issued to K. F. Williams on July 15, 1952; 3,133,395 issued to E. W. Farmer on May 19, 1964; 3,395,465 issued to S. J. Andreasen et al on Aug. 8, 1968; 3,468,106 issued to R. R. Myers et al on Sept. 23, 1969; 3,774,686 issued to L. H. Michener on Nov. 27, 1973, 3,804,177 issued to W. D. Rinfroe on Apr. 16, 1974 and 3,814,190 issued to W. L. Wilson on June 4, 1974.

The above mentioned patents disclose a variety of methods of clearing land or harvesting aquatic weeds, including the dragging of inter-connected containers over terrain to be cleared; the scooping of floating or suspended vegetation, or material from the bottom of a waterway; the dragging of weighted bodies with blades, blades themselves or flexible chains with attached blades along the bottom of a lake or a river to cut weeds close to the bottom thereof; the use of opposed endless conveyor belts movable with respect to each other for grasping and pulling weeds; and the use of a rake or scarifier including a plurality of rigid shafts interconnected end-to-end, each shaft having staggered, elongated teeth for raking when the rake is rotated along the ground.

Obviously, the partial removal of weeds by cutting close to the ground is unsatisfactory, since the weeds will return much more quickly than if removed completely. The apparatus which is purported to pull weeds from the ground appears to be quite complicated and cumbersome. There definitely exists a need for a simple apparatus and method for harvesting plants, and in particular acquatic weeds.

The object of the present invention is to provide a relatively simple method and harvester for harvesting weeds. While the harvester described hereinafter may be intended for harvesting weeds found below water in waterways and on the banks of such water ways it will be appreciated that the harvester can be used to remove plants, particularly long thin plants on dry land.

SUMMARY OF THE INVENTION

Accordingly, the invention relates to a plant harvester comprising cable means and drive means for rotating said cable means around the longitudinal axis thereof, whereby, when the cable means is rotated in contact with plants, the plants are wrapped around the cable means and thus pulled from the ground.

The invention also relates to a method of harvesting plants comprising the steps of rotating cable means in contact with the plants to cause the plants to wind around the cable means; and moving the cable means relative to the plants to pull the plants from the ground.

Obviously, the apparatus and method described above are not intended to replace conventional grain or grass cutters or harvesters. A distinct advantage of the apparatus of the present invention is that the harvester can be used to harvest weeds or other plants on rough terrain, even on dry land.

BRIEF DESCRIPTION OF THE DRAWINGS

The invention will now be described in greater detail with reference to the accompanying drawings, which illustrate preferred embodiments of the invention, and wherein;

FIGS. 3 to 8 are schematic drawings of may possible harvesting operations using the harvester of the present invention.

Figure 1:
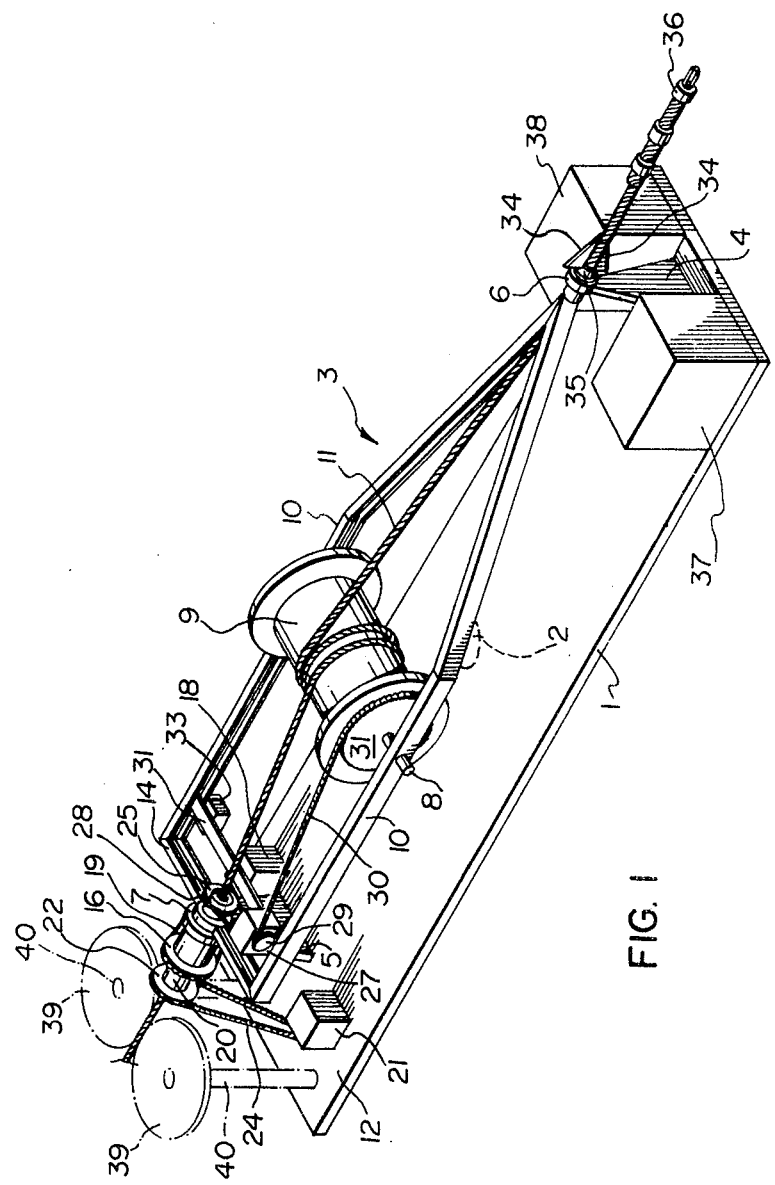
FIG. 1 is a schematic perspective view of a plant harvester in accordance with the present invention.

In the drawings and in particular in FIG. 1, many of the elements, e.g., motors have been shown simply as boxes to avoid unnecessarily cluttered drawings. Moreover, elements which form part of a second embodiment of the apparatus are shown in phantom outline at one end of FIG. 1.

Figure 2:
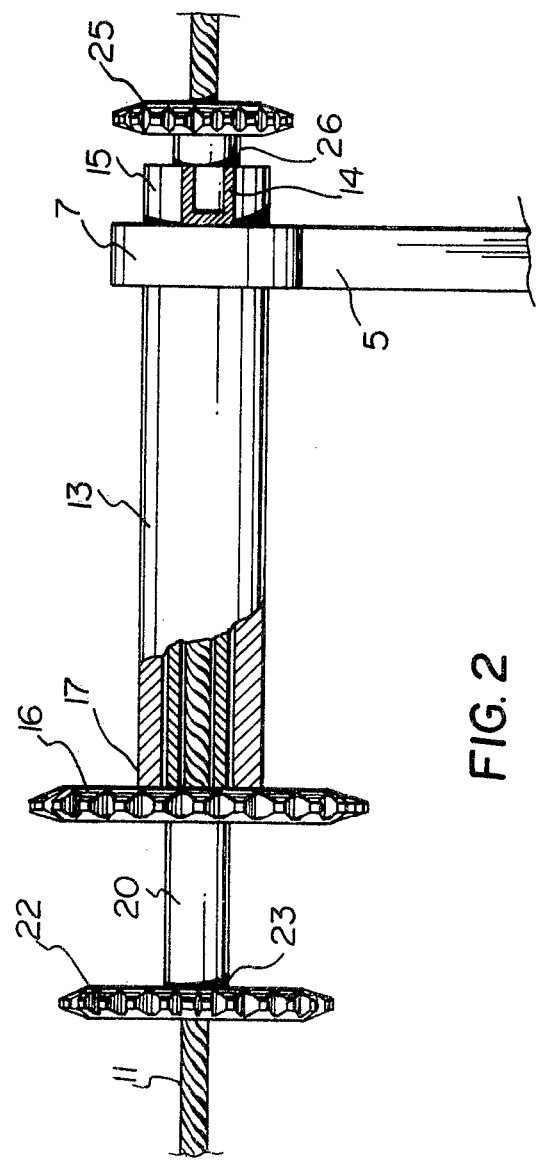
FIG. 2 is a longitudinal sectional view of a portion of drive elements of the harvester of FIG. 1.

With reference to FIGS. 1 and 2 of the drawings, the plant harvester of the present invention includes a base of platform 1, which is rotatably mounted on a vehicle (a boat or truck not shown) for rotation around a vertical axis by means of a shaft 2 perpendicular to the platform. An elongated frame generally indicated at 3, is rotatably mounted on supports 4 and 5 at the ends of the platform 1. Aligned bearings 6 and 7 are provided at the top end of the supports 4 and 5, respectively, so that the platform 1 is free to rotate around the longitudinal axis of the bearings, i.e., around a horizontal axis through the aligned bearings.

A shaft 8 extends through a drum 9 and through frame sides 10 for rotatably supporting the drum 8 between the sides of the frame 3. The drum 9 supports a cable 11, which is wound around the drum for movement through the frame 1. The cable 11 passes through the centre of the bearings 6 and 7 and the frame 3.

The frame 3 and the drum 9 are rotated by drive elements located predominantly at one end 12 of the platform 1. As best illustrated in FIG. 2, the bearing 7 rotatably supports a cylindrical sleeve 13, which passes through the bearing. Rear end 14 of the frame 3 is connected to one end 15 of the sleeve 13. A toothed wheel 16 is mounted on outer end 17 of the sleeve 13 for rotating the sleeve, and consequently the frame 3 around the longitudinal axes of the aligned bearings 6 and 7, i.e., around a horizontal axis through such bearings. The toothed wheel 16 is driven by a hydraulic motor 18 mounted on the platform 1 and connected to the wheel 16 by an endless chain 19.

A second hollow, cylindrical sleeve or shaft 20 is rotatably mounted in the sleeve 13. The shaft 20 extends beyond the ends 14 and 17 of the sleeve 13. A second hydraulic motor 21 mounted on the platform 1 is connected to a toothed wheel 22 on one end 23 of the shaft 20 by a chain 24. A toothed wheel 25 on the other end 26 of the shaft 20 is connected to a toothed wheel (not shown) of a right angle drive 27 by a chain 28. Another toothed wheel 29 of the drive 27 and an endless chain 30 connect the drive 27 and consequently the hydraulic motor 21 to the drum 9. The chain 30 passes around a toothed wheel 31 on one end of the drum 9. The drive 27 is mounted on one end of a cross-brace 32. A counterweight 33 is attached to the other end of the cross-brace 32 so that the centre of gravity of the frame 3 is located at the longitudinal centre thereof.

A pair of triangular blades 34 are mounted on a sleeve 35 which extends outwardly from the front end of the casing of the bearing 6. The blades 34 are intended to cut plant matter on the cable 11 as the cable is drawn through the bearing 6. A swivel element 36 is provided on the outer end of the cable 11 for rotatably connecting the cable to another cable (not shown) for a purpose described hereinafter in detail. In other words, the swivel element 36 is used only in one specific operation of the harvester.

An engine and a hydraulic pump 37 are mounted on one side of the front end of the platform 1, and a fuel tank and hydraulic fluid reservoir 38 are mounted on the other side of such front end of such platform so that the load on the platform 1 is balanced. Of course, these elements are connected to the motors 18 and 21 by pipes (not shown).

In another embodiment of the invention, a pair of pulleys 39 are rotatably mounted on the top ends of posts 40 at the end of 12 of the platform 1. The pulleys 39 are also used for a specific operation of the harvester, i.e., when an endless cable 11 is used. In the present case, the term cable is intended to mean any sufficiently strong wire rope, hemp rope, chain or flexible metal rod.

It will be noted that bearings or bushings between the sleeve 13 and the shaft 20 have been omitted. Moreover, the sleeve 13 and the shaft 20 are shown as cantilevered from the bearing 7. As a practical matter additional support for these elements would be provided at or near the ends bearing toothed wheels 16 and 22. However, parts have purposely been omitted for the sake of keeping the drawings and description as simple as possible.

OPERATION

The operation of the harvester will now be described with reference to FIGS. 3 to 8. In all modes of operation the frame 3 is rotated with respect to the platform 1 to cause the cable 11 to rotate. As the rotating cable 11 is dragged along the bottom of a lake or river weeds are wound around the cable. Continued movement of the cable results in pulling of the weeds.

With reference to FIG. 3, in one embodiment of the method of the present invention, the frame 3 and platform 1 are pivotally mounted for rotation around a vertical axis on a truck 42. One end of the cable 11 is wound around and retained by the drum 9, and the other end is pivotally connected to a boat 43 by coupling 44. As the truck 42 moves along the shore of a lake, the boat moves along the lake parallel to the shore. The frame 3 and the cable 11 are rotated, causing weeds to become twisted on the cable. Thus weeds are pulled from the bottom of the lake. The cable 11 is periodically uncoupled from the boat 43 and drawn onto the drum 9 by actuation of the motor 21. As the cable 11 passes between the blades 34, the weeds are cut and dropped into a container or onto the truck bed.

Referring to FIG. 4, in an endless mode of operation, the cable 11 passes through a frame 3 pivotally mounted on a truck 42, crosses a narrow body of water 45, passes around a pulley 46 mounted on a second vehicle 47 on the other side of the body of water, and returns to the frame 3. In the endless mode of operation the cable 11 passes around the drum 9 which is allowed to rotate freely, acting as a capstan and then passes through the hollow shaft 20 and around one of the pulleys 39. This embodiment of the method of the present invention can be used to remove weeds from a canal or ditch having widths of at least 120 feet.

The embodiment of the invention illustrated in FIG. 5, is a second endless mode, in which two frames 3 are mounted on a pair of vessels 48, which can be boats or barges. The vessels 48 are moved along a body of water in generally parallel relationship to each other while the frames 3 and cable 11 are continuously rotated. At the same time, the cable 11 is drawn through the frames 3 around the drum 9 so that weeds are continuously cut from the cable 11.

In another endless mode of operation (FIG. 6) similar to that illustrated in FIG. 5, a pair of frames 3 are mounted on a pair of trucks 49 on opposite sides of a canal or ditch 50. As the trucks 49 move along the waterway 50, the cable continuously moves between the frames 3 to harvest weeds from the waterway. The same arrangement is illustrated in FIG. 7, except that one of the trucks 49 is replaced by a boat 51. The boat and truck of FIG. 7 would be used to harvest weeds from a river or a lake.

Finally, as illustrated in FIG. 8, the harvester can be used to harvest vegetation from an incline 52, on dry land. One end of the cable 11 is connected to a frame 3 on a vehicle 53 at the top of the incline 52, and the other end of the cable is pivotally connected to a second vehicle 54 at the bottom of the incline. The cable 11 is moved across the incline to remove dry grass, small shrubs or weeds.

While it is not illustrated in the drawings showing the different modes of operation, one end of a cable 11 can be connected to a frame 3 for rotation therewith. With the other end of the cable 11 connected to a swivel element 36, the cable can be rotated and reciprocated between the frames 3. Thus, the cable 11 can be quickly returned to the extended position after removal of the weeds therefrom.

CONCLUSION

In using the harvester of the present invention, layers of plants having a diameter of one foot can be built up on the cable. The cables used have a diameter of, for example ¾ inch and an effective length in the region of 225 feet. When dealing with common water weeds such as buttercup, milfoil, elodea, pondweed, stonewort and cottontail, the harvester has proven fairly effective. Shore plants such as cattail, bulrush, etc., are more difficult to harvest. However, it is anticipated that this difficulty would be overcome by increasing the size and power of the harvester.

What we claim is:

1. A plant harvester comprising cable means; and first drive means for positively rotating said cable means around the longitudinal axis thereof, whereby when the cable means is rotated in contact with plants, the plants are wrapped around the cable means and thus pulled from the ground, said cable means comprising an uninterrupted predetermined length of cable devoid of swivel or other relatively rotatable couplings such that the rotational drive of said first drive means is transmitted along the full predetermined length of cable for wrapping and pulling plants from the ground.

2. A plant harvester according to claim 1, including means for mounting said first drive means on a vehicle, whereby the cable means can be drawn through the plants in a direction substantially perpendicular to the longitudinal axis of such cable means while being rotated by said first drive means.

3. A plant harvester according to claim 1, including frame means for mounting on a vehicle; means connecting said cable means to said frame means, said first drive means being adapted to rotate said frame means with said cable means; and means mounting said frame means on the vehicle, whereby said cable means can be drawn through the plants in a direction substantially perpendicular to the longitudinal axis of such cable means while being rotated with said frame means.

4. A plant harvester according to claim 3, including winch means mounted on said frame means for receiving said cable means, said winch means being rotatable with said frame means and said cable means.

5. A plant harvester according to claim 3, including platform means; shaft means for pivotally mounting said platform means on a vehicle for rotation around a vertical axis; and bearing means on said platform means for pivotally supporting said frame means for rotation around a horizontal axis.

6. A plant harvester according to claim 5, including winch means mounted on said frame means for rotation therewith, said winch means receiving said cable means; and second drive means for rotating said winch means to wind the cable means onto said winch means.

7. A plant harvester according to claims 3, 4, 5 or 6 including blade means on said frame means for cutting plants from said cable means.

8. A plant harvester according to claim 1 including means for transporting said first drive means in a direction generally transverse to the longitudinal axis of said cable means, means for moving said cable means in the direction of its longitudinal axis, and blade means for cutting plants from said cable means as said cable means moves along its longitudinal axis.

9. A plant harvester as claimed in claim 1 wherein said cable means is a wire rope devoid of sharp cutting surfaces.

10. A method of harvesting plants comprising the steps of rotating cable means in contact with the plants to cause the plants to wind around the cable means; moving the cable means relative to the plants to pull the plants from the ground; and cutting plants from part of said cable means while plants are being pulled by another part thereof.

11. A method according to claim 10, wherein said cable means is moved through the plants simultaneously (a) in a direction perpendicular to the longitudinal axis of the cable means to effect plant pulling, and (b) in the direction of said longitudinal axis out of contact with uncut plants.

* * * * *